US008363347B2

(12) United States Patent
Higashino et al.

(10) Patent No.: US 8,363,347 B2
(45) Date of Patent: Jan. 29, 2013

(54) STORAGE DEVICE AND INFORMATION CORRECTION METHOD

(75) Inventors: Yoshinari Higashino, Tokyo (JP); Hideo Sado, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/224,689

(22) Filed: Sep. 2, 2011

(65) Prior Publication Data

US 2012/0155238 A1 Jun. 21, 2012

(30) Foreign Application Priority Data

Dec. 17, 2010 (JP) ................................ 2010-282139

(51) Int. Cl.
*G11B 21/02* (2006.01)
*G11B 7/00* (2006.01)

(52) U.S. Cl. ....................... 360/75; 360/78.15; 369/47.1

(58) Field of Classification Search .................... 360/48, 360/76, 75, 77.07, 72.2, 77.05, 77.08, 78.14, 360/78.01, 25, 78.15; 369/47.1

See application file for complete search history.

(56) References Cited

U.S. PATENT DOCUMENTS 8,000,048 B2 * 8/2011 Wilson ........................... 360/48

* cited by examiner

*Primary Examiner* — Nabil Hindi
(74) *Attorney, Agent, or Firm* — Patterson & Sheridan, LLP (57) ABSTRACT

An information correcting method includes: detecting a first pattern in a radial direction and a second pattern formed obliquely to the radial direction on a track traversing the first and second patterns; counting number of the first pattern until the count value reaches number of the first pattern in one round of the track; generating a value incremented up number of the second pattern in the one round every time an interrupt associated with detection of the second pattern is generated as number of the second pattern; calculating an ideal number from a value obtained by multiplying the number of the second pattern until the number is counted by the counted number of the detected first pattern and a number set to the second pattern with reference to the second pattern formed at a present initial position; and correcting the generated number with the ideal number.

12 Claims, 9 Drawing Sheets

(a) RELATIONSHIP BETWEEN SPIRAL PATTERN INTERRUPT GENERATED AT POSITION 1, SPIRAL NUMBER, AND IDEAL SPIRAL NUMBER

(b) RELATIONSHIP BETWEEN SPIRAL PATTERN INTERRUPT GENERATED AT POSITION 2, SPIRAL NUMBER, AND IDEAL SPIRAL NUMBER (c) RELATIONSHIP BETWEEN SPIRAL PATTERN INTERRUPT GENERATED AT POSITION 3, SPIRAL NUMBER, AND IDEAL SPIRAL NUMBER (d) RELATIONSHIP BETWEEN SPIRAL PATTERN INTERRUPT GENERATED AT POSITION 4, SPIRAL NUMBER, AND IDEAL SPIRAL NUMBER

STORAGE DEVICE AND INFORMATION CORRECTION METHOD

CROSS-REFERENCE TO RELATED APPLICATIONS

This application is based upon and claims the benefit of priority from Japanese Patent Application No. 2010-282139, filed Dec. 17, 2010, the entire contents of which are incorporated herein by reference.

FIELD

Embodiments described herein relate generally to a storage device and an information correction method.

BACKGROUND

In storage devices such as a magnetic disk device, servo patterns used for positioning control of a recording/reproducing head are formed on a recording medium such as a magnetic disk. To form such servo patterns on the recording medium, seed patterns formed at a part of the recording medium in the radial direction, and spiral servo patterns formed in a spiral manner so as to intersect the seed patterns may be used. The storage device uses the servo patterns detected by the recording/reproducing head to control positioning of the recording/reproducing head on a target track on the recording medium.

Such a storage device that performs the positioning control of the recording/reproducing head using the servo patterns, before recording the servo patterns in sectors, detects the spiral servo patterns from a read signal supplied from the recording/reproducing head, and generates a value incremented every time an interrupt is generated in association with the detection of the spiral patterns as a spiral number of the detected spiral servo patterns.

In the conventional technology, if the interrupt generated in association with the detection of the spiral patterns is skipped (not generated), the value incremented every time the interrupt is generated fails to be updated, resulting in a discrepancy in the spiral number of the detected spiral servo patterns.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, a storage device includes: a disk including a first pattern formed in a radial direction of the disk on at least one of an inner area and an outer area of the disk, and a second pattern formed obliquely to the radial direction; a detector configured to detect the first pattern and the second pattern on a track traversing the first pattern and the second pattern on the disk; a counter configured to count number of the detected first pattern until the count value reaches number of the first pattern in one round of the track; a generator configured to generate a value incremented until the value reaches a maximum pattern number that is number of the second pattern in one round of the track every time an interrupt is generated in association with detection of the second pattern as number of the second pattern detected by the detector; a calculator configured to calculate an ideal number based on a multiplied value and a radial direction reference number, wherein the multiplied value is obtained by multiplying the number of the second pattern detected until the number is counted by the counter by the counted number of the detected first pattern, and the radial direction reference number is set to the second pattern formed in the radial direction of the disk with reference to the second pattern formed at a preset initial position; and a corrector configured to correct the generated number with the calculated ideal number if the generated number is not identical to the calculated ideal number.

Figure 1:
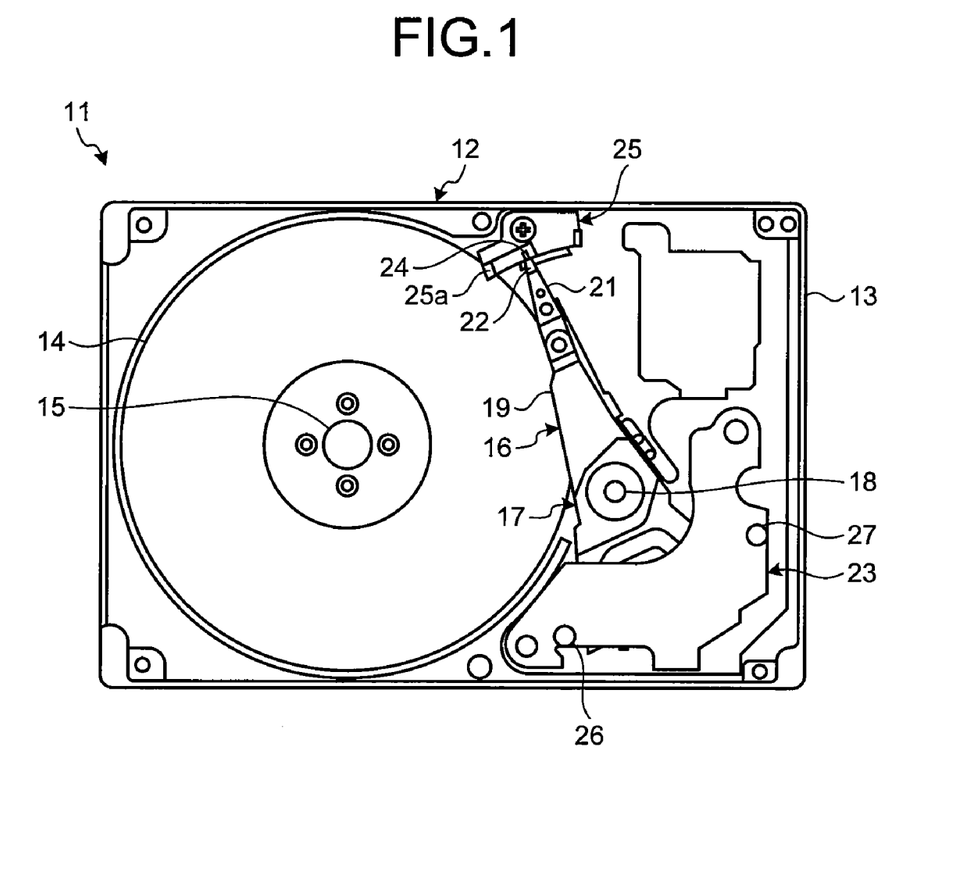
FIG. 1 is an exemplary plane view schematically illustrating an internal structure of a hard disk drive (HDD) according to an embodiment.

FIG. 1 is an exemplary plane view schematically illustrating an internal structure of a hard disk drive (HDD) according to an embodiment.

As illustrated in FIG. 1, a hard disk drive (HDD) 11 that is a specific example of a recording device comprises a case or a housing 12. The housing 12 is formed of a box-shaped base 13 and a cover (not illustrated). The base 13 defines, for example, an internal space of a flat rectangular parallelepiped, that is, a housing space.

At least one magnetic disk 14, which is a specific example of a recording medium, is housed in the housing space. The magnetic disk 14 is mounted on a spindle shaft of a spindle motor 15. The spindle motor 15 can rotate the magnetic disk 14 at high speed of 5400 rpm, 7200 rpm, 10000 rpm, and 15000 rpm, for example.

A carriage 16 is also housed in the housing space. The carriage 16 comprises a carriage block 17. The carriage block 17 is rotatably connected to a shaft 18 stretching from a bottom plate of the base 13 in the vertical direction. A plurality of carriage arms 19 extending from the shaft 18 in the horizontal direction are integrated with the carriage block 17.

A head suspension 21 is attached to an end of each of the carriage arms 19. The head suspension 21 extends forward from the end of the carriage arm 19. A flexure is affixed to the head suspension 21. A flying head slider 22 is supported on the flexure. The flexure allows the flying head slider 22 to change its position with respect to the head suspension 21. A head, that is, an electromagnetic transducer element 40 (refer to FIG. 2) is mounted on the flying head slider 22.

Figure 2:
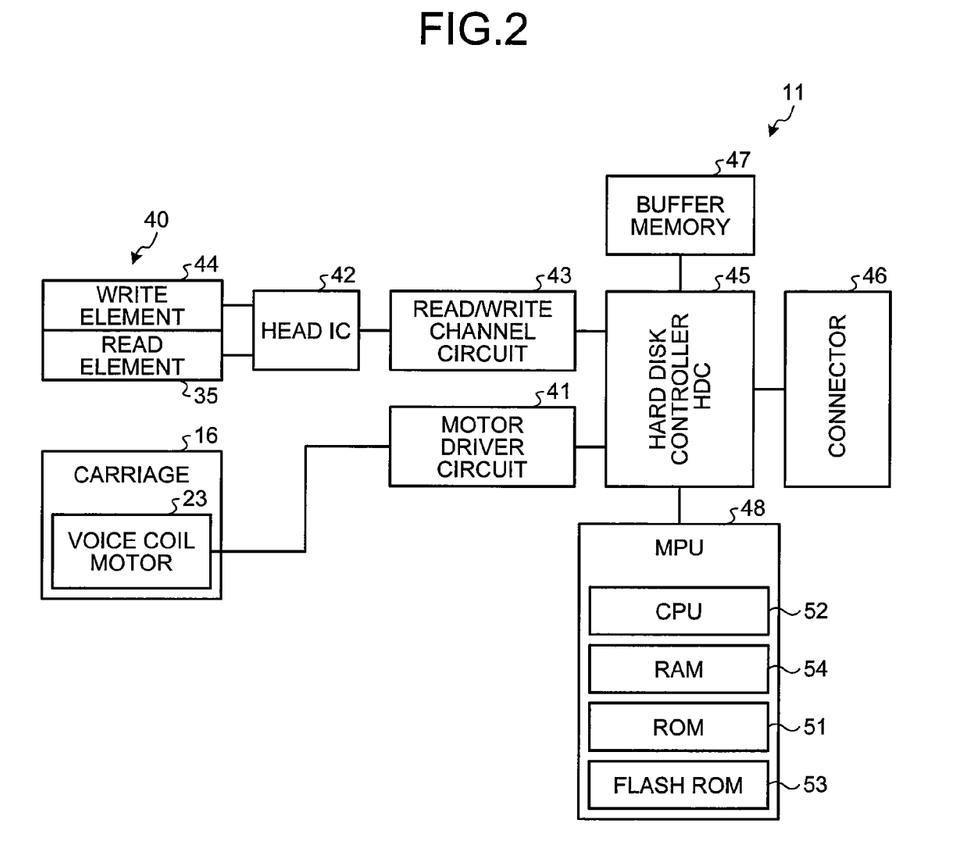
FIG. 2 is an exemplary block diagram schematically illustrating a control system of a tracking servo in the embodiment.

The electromagnetic transducer element 40 comprises a write element 44 (refer to FIG. 2) and a read element 35 (refer to FIG. 2). A so-called single-pole head is used for the write element 44. The single-pole head generates a magnetic field by an action of a thin-film coil pattern. The magnetic field acts on the magnetic disk 14 in the vertical direction perpendicular to the surface of the magnetic disk 14 by an action of the main magnetic pole. Information is written to the magnetic disk 14 by the action of the magnetic field. On the other hand, a giant magnetoresistive (GMR) element or a tunneling magnetoresistive (TMR) element is used for the read element 35. In the GMR element or the TMR element, a resistance change in a spin-valve film or a tunnel junction film is caused depending on the direction of the magnetic field acting from the magnetic disk 14. Information is read from the magnetic disk 14 based on such a resistance change.

When an air current is generated on the surface of the magnetic disk 14 by rotation of the magnetic disk 14, positive pressure, that is, buoyancy, and negative pressure act on the flying head slider 22 by the action of the air current. The buoyancy, the negative pressure, and pressing force of the head suspension 21 are in balance. Such balance enables the flying head slider 22 to keep floating at relatively high stiffness during the rotation of the magnetic disk 14.

A voice coil motor (VCM) 23 is connected to the carriage block 17. The VCM 23 allows the carriage block 17 to rotate about the shaft 18. With the rotation of the carriage block 17, reciprocations of the carriage arm 19 and the head suspension 21 are realized. The carriage arm 19 reciprocates about the shaft 18 while the flying head slider 22 is floating, thereby enabling the flying head slider 22 to move along the radius line of the magnetic disk 14. As a result, the electromagnetic transducer element 40 mounted on the flying head slider 22 can traverse concentric recording tracks between the innermost recording track and the outermost recording track. With such a movement of the flying head slider 22, the electromagnetic transducer element 40 moves along the radius line of the magnetic disk 14 to be positioned on a target recording track.

The movable range of the carriage arm 19 is limited by an outer stopper 26 and an inner stopper 27 arranged in the carriage block 17.

An end of the head suspension 21 is sectioned into a loading tab 24 extending forward therefrom. The reciprocations of the carriage arm 19 allow the loading tab 24 to move in the radial direction of the magnetic disk 14. A ramp member 25 is arranged on the movement path of the loading tab 24 and outside of the magnetic disk 14. The ramp member 25 is fixed to the base 13. The ramp member 25 receives the loading tab 24.

On the ramp member 25, a ramp 25a extending along the movement path of the loading tab 24 is formed. The ramp 25a is formed in a manner apart from a virtual plane including the surface of the magnetic disk 14 as the ramp 25a is apart from the rotation axis of the magnetic disk 14. Therefore, when the carriage arm 19 is moved about the shaft 18 away from the rotation axis of the magnetic disk 14, the loading tab 24 is caused to move up the ramp 25a. In this manner, the flying head slider 22 is separated from the surface of the magnetic disk 14. The flying head slider 22 is escaped outside of the magnetic disk 14. On the contrary, when the carriage arm 19 reciprocates about the shaft 18 toward the rotation axis of the magnetic disk 14, the loading tab 24 is caused to move down the ramp 25a. The buoyancy acts on the flying head slider 22 from the rotating magnetic disk 14. The ramp member 25 and the loading tab 24 cooperate to form a so-called loading/unloading mechanism.

A control system of the HDD 11 will now be described. FIG. 2 is an exemplary block diagram schematically illustrating the control system of a tracking servo. As illustrated in FIG. 2, a motor driver circuit 41 is connected to the VCM 23. The motor driver circuit 41 supplies a drive current to the VCM 23. Based on the supplied drive current, the VCM 23 can be displaced by a specified amount of displacement. Such an amount of displacement is set based on the amount of rotation (angle of rotation) of the carriage block 17.

A read/write channel circuit 43 is connected to a head IC 42. The read/write channel circuit 43 modulates or demodulates a signal in accordance with a predetermined modulation and demodulation method. A modulated signal, that is, a write signal is supplied to the head IC 42. The head IC 42 then amplifies the write signal. The amplified write signal is supplied to the write element 44. A read signal output from the read element 35 is amplified by the head IC 42, and supplied to the read/write channel circuit 43. The read/write channel circuit 43 then demodulates the read signal.

A hard disk controller (HDC) 45 is connected to the motor driver circuit 41 and the read/write channel circuit 43. The HDC 45 supplies a control signal to the motor driver circuit 41. Based on the control signal, the output of the motor driver circuit 41, that is, the drive current is controlled. In the same manner, the HDC 45 sends a write signal to be modulated to the read/write channel circuit 43, and receives a demodulated read signal from the read/write channel circuit 43. The write signal to be modulated may be generated in the HDC 45 based on data received from a host computer, for example. The data from the host is transferred to the HDC 45 via a connector 46. A control signal cable and a power cable (none of which is illustrated) extending from the main board of the host computer may be connected to the connector 46, for example. In the same manner, the HDC 45 reproduces data based on the demodulated read signal. The reproduced data may be output to the host computer via the connector 46. In transmission and reception of such data, the HDC 45 may use a buffer memory 47, for example. The buffer memory 47 stores therein the data temporarily. A synchronous dynamic random access memory (SDRAM) may be used for the buffer memory 47, for example.

A microprocessor unit (MPU) 48 is connected to the HDC 45. The MPU 48 comprises a central processing unit (CPU) 52 that operates based on a computer program stored in a read-only memory (ROM) 51, for example. Such computer programs include a computer program for positioning the electromagnetic transducer element 40 according to the embodiment. The computer program for positioning the electromagnetic transducer element 40 may be provided as so-called firmware. The CPU 52 can obtain data from a flash ROM 53, for example, so as to realize the operation. Such a computer program and data can be stored in a random access memory (RAM) 54 temporarily. The ROM 51, the flash ROM 53, and the RAM 54 may be connected to the CPU 52 directly.

Figure 3:
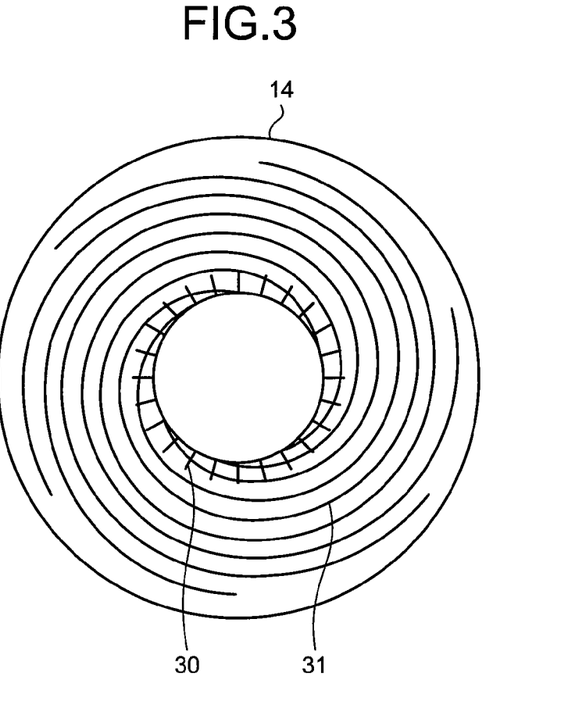
FIG. 3 is an exemplary plane view of a magnetic disk in the embodiment.

The magnetic disk 14 will now be described with reference to FIG. 3. FIG. 3 is an exemplary plane view of the magnetic disk.

As illustrated in FIG. 3, the magnetic disk 14 is a recording medium that records data by changing a magnetized state of a magnetic material. On the magnetic disk 14, seed patterns (first patterns) 30 and spiral patterns (second patterns) 31 used for positioning control of the electromagnetic transducer element 40 upon recording servo patterns are formed. In other words, no servo pattern is formed on the magnetic disk 14 in an initial state. As illustrated in FIG. 3, the seed patterns 30 are formed on a part of an inner area of the magnetic disk 14 in a manner extending in the radial direction, and the spiral patterns 31 are formed obliquely from the inner circumference to the outer circumference in the radial direction of the magnetic disk 14 on the entire surface of the magnetic disk 14. The seed patterns 30 and the spiral patterns 31 are formed in advance by an external servo track writing (STW) system before the magnetic disk 14 is housed in the housing 12. The seed patterns 30 may be formed at positions other than the inner area of the magnetic disk 14, for example, on an outer area. Alternatively, the seed patterns 30 may be formed on both of the inner area and the outer area.

In other words, the seed patterns 30 are formed radially on the inner area of the magnetic disk 14. On the other hand, the spiral patterns 31 are formed spirally (helically) in a manner intersecting the seed patterns 30. In the embodiment, when the servo patterns are recorded on the magnetic disk 14, the electromagnetic transducer element 40 is positioned on a concentric track in the inner circumference of the magnetic disk 14. In other words, the electromagnetic transducer element 40 reads the seed patterns 30 and the spiral patterns 31 while traversing them on the track. In the embodiment, before the servo patterns are recorded, the target pattern to be controlled is switched from a seed pattern 30 to a spiral pattern 31.

Figure 4:
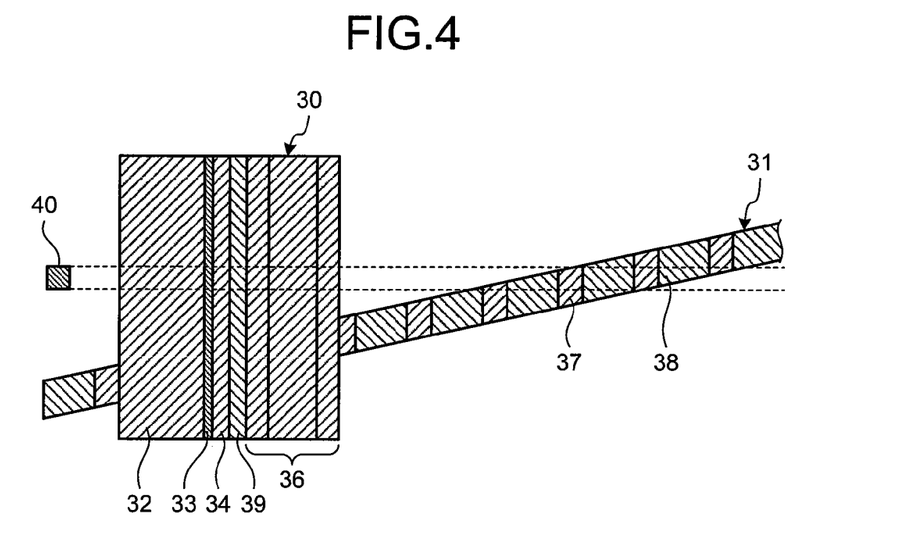
FIG. 4 is an exemplary view for explaining a data format recorded in a seed pattern and a spiral pattern in the embodiment.

A data format recorded in the seed pattern 30 and the spiral pattern 31 will now be described with reference to FIG. 4. FIG. 4 is an exemplary view for explaining the data format recorded in the seed pattern and the spiral pattern.

The seed pattern 30 comprises a preamble 32, a servo sync mark 33, a seed sector data 34, a Gray code 39, and a phase burst 36. The preamble 32 is used for adjusting the amplification factor of a reproduced output to keep the amplitude constant before the servo data such as the sector data and the Gray code is read. The servo sync mark 33 is used for finding the beginning of the servo data. The seed sector data 34 has a seed sector number indicating what number the seed sector is in one track. The Gray code 39 has a track number indicating what number the track is among the tracks formed concentrically on the magnetic disk 14. The phase burst 36 has relative position information of the electromagnetic transducer element 40 with respect to the track, and is used for positioning the electromagnetic transducer element 40 on the center of the target track accurately.

The spiral pattern 31 comprises a sync mark 37 and a burst 38. The sync mark 37 is used as reference timing information in the circumferential direction of the magnetic disk 14. In the burst 38, an amplitude position timing indicates the position of the spiral pattern 31. The time subtraction between the reference timing obtained by the sync mark 37 and the peak position timing of the burst 38 is converted into a position error amount in the radial direction to obtain relative position information of the spiral pattern 31. The relative position information thus obtained is used for positioning the electromagnetic transducer element 40 on the center of the target track.

Figure 5:
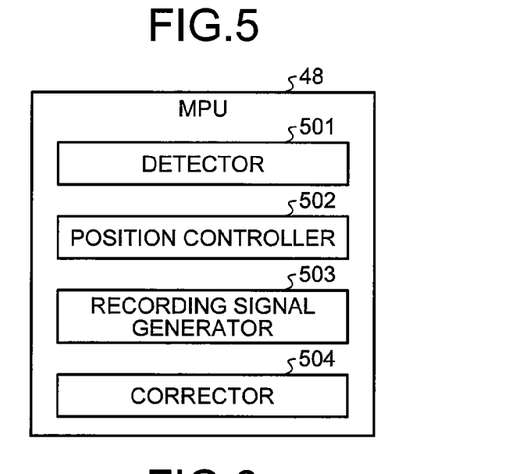
FIG. 5 is an exemplary functional block diagram for realizing positioning processing of an electromagnetic transducer element in the embodiment.

A functional block realized by the CPU 52 executing the positioning program stored in the ROM 51 will now be described with reference to FIG. 5. FIG. 5 is an exemplary functional block diagram for realizing positioning processing of the electromagnetic transducer element.

As illustrated in FIG. 5, the MPU 48 realizes a detector 501, a position controller 502, a recording signal generator 503, a corrector 504, and the like by the CPU 52 following the positioning program.

The detector 501 detects the seed pattern 30 and the spiral pattern 31 from a read signal read by the electromagnetic transducer element 40 and demodulated in the read/write channel circuit 43. The position controller 502 performs control to position the electromagnetic transducer element 40 at a desired position on the magnetic disk 14. For example, the position controller 502 performs the control to position the electromagnetic transducer element 40 at a target position on the magnetic disk 14 by using the seed pattern 30 and the spiral pattern 31. The recording signal generator 503 generates a recording signal for recording servo patterns at the target position on the magnetic disk 14 by the electromagnetic transducer element 40 positioned at the target position. The corrector 504 performs generation processing of a spiral number of the spiral pattern 31 detected by the detector 501, and correction processing of a discrepancy in the spiral number.

Figure 6:
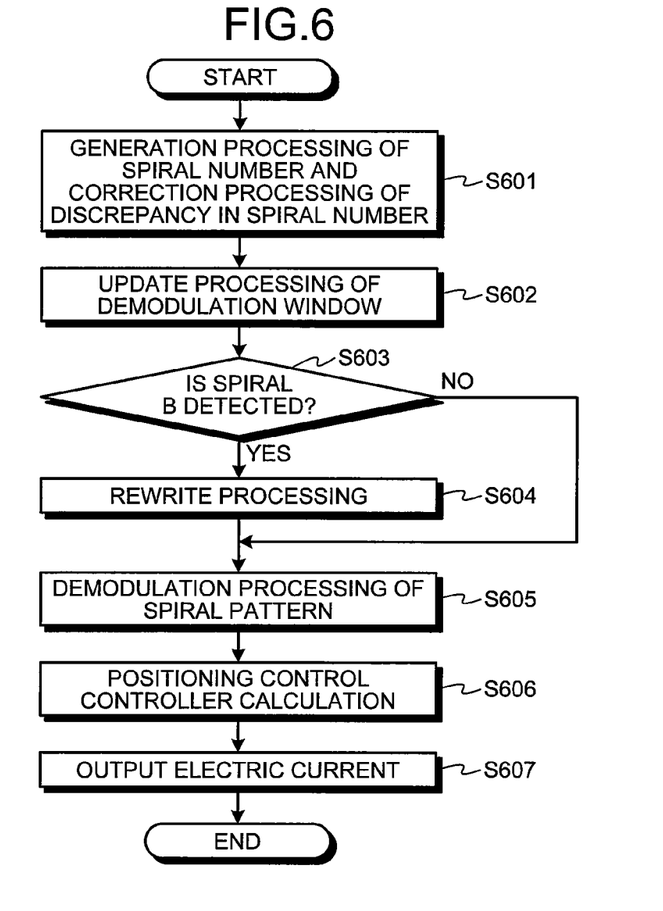
FIG. 6 is an exemplary flowchart illustrating the procedure of positioning control processing of the electromagnetic transducer element when servo patterns are recorded in the magnetic disk in the embodiment.

The positioning control of the electromagnetic transducer element 40 performed when recording the servo patterns in the magnetic disk 14 will now be described with reference to FIG. 6. FIG. 6 is an exemplary flowchart illustrating the procedure of positioning control processing of the electromagnetic transducer element when the servo patterns are recorded in the magnetic disk.

When an interrupt (hereinafter, referred to as a "spiral pattern interrupt") in association with the detection of the spiral pattern 31 by the detector 501 is generated, the corrector 504 performs the generation processing of a spiral number of the detected spiral pattern 31, and the correction processing of a discrepancy in the spiral number (S601). The details of the generation processing of the spiral number and the correction processing of the discrepancy in the spiral number performed by the corrector 504 will be described later.

The detector 501 then performs demodulation window update processing for opening (outputting) a demodulation window 70 (refer to FIG. 7C) that is a timing signal for detecting the spiral pattern 31 (S602). More specifically, if the detected spiral pattern 31 is a spiral pattern 31 (spiral B) detected for the second time among two spiral patterns 31 detected between operational timings at which the seed patterns 30 are detected, the detector 501 performs timing setting for opening the demodulation window so as to detect (demodulate) a spiral pattern 31 (spiral A) detected for the first time. On the other hand, if the detected spiral pattern 31 is the spiral pattern 31 (spiral A) detected for the first time among two spiral patterns 31 detected between the operational timings at which the seed patterns 30 are detected, the detector 501 performs the timing setting for opening the demodulation window so as to detect (demodulate) the spiral pattern 31 (spiral B) detected for the second time.

Figure 7A:
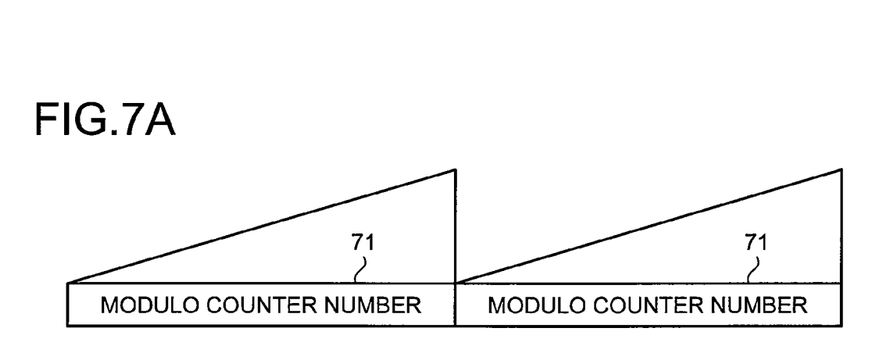
FIG. 7A is an exemplary view illustrating the relationship between the seed pattern and a modulo counter number in the embodiment.
Figure 7B:
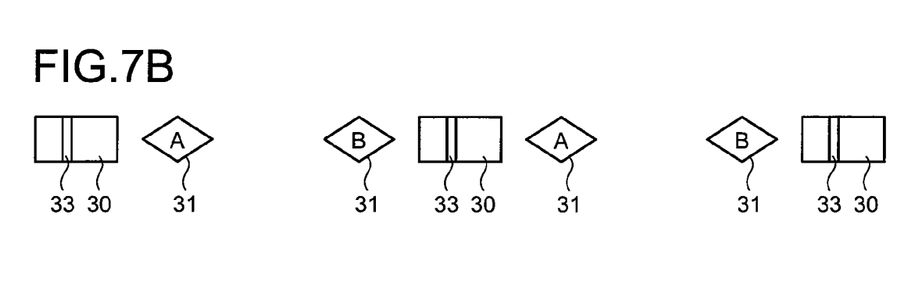
FIG. 7B is an exemplary waveform diagram of the seed patterns and the spiral patterns read by the electromagnetic transducer element and demodulated in the embodiment.
Figure 7C:
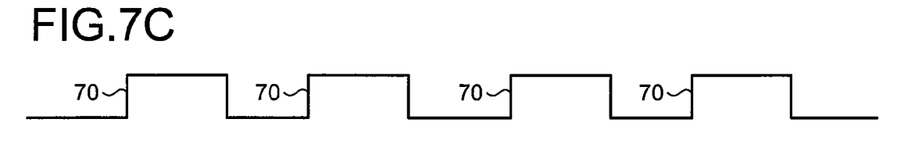
FIG. 7C is an exemplary view of the demodulation window for detecting the spiral pattern in the embodiment.

FIGS. 7A, 7B, and 7C are exemplary views for explaining the detection processing of the spiral patterns and count up of a modulo counter number performed by a modulo counter. FIG. 7A is an exemplary view illustrating the relationship between the seed pattern 30 (servo sync mark 33) and a modulo counter number 71. The module counter number 71 is a number counted up (counted) based on the operational timing at which the detector 501 detects the seed pattern 30 (servo sync mark 33). In the embodiment, the module counter number 71 is counted up by the modulo counter established by the corrector 504. The corrector 504 resets (initializes) the modulo counter number 71 every time the modulo counter number 71 thus counted up reaches the number of the seed patterns 30 in one round of the track.

Furthermore, in the embodiment, as well as counting up the modulo counter number 71, the corrector 504 counts a modulo counter value between the operational timings at which the seed patterns 30 (servo sync marks 33) are detected. The modulo counter value is a counter value counted by the corrector 504 (modulo counter) between the seed patterns 30.

FIG. 7B is an exemplary waveform diagram of the seed patterns 30 and the spiral patterns 31 read by the electromagnetic transducer element 40 and demodulated. FIG. 7C is an exemplary view of the demodulation window 70 for detecting the spiral pattern 31. In the embodiment, as illustrated in FIG. 7B and FIG. 7C, the detector 501 opens the demodulation window 70 twice to detect two spiral patterns 31 (spiral A and spiral B) while the modulo counter established by the corrector 504 counts the modulo counter value (or until the modulo counter number 71 is counted up).

Referring back to FIG. 6, if the spiral pattern 31 detected by the detector 501 is the spiral B (YES at S603), the recording signal generator 503 performs rewrite processing for generating a recording signal used for recording a servo pattern (S604). In the rewrite processing, similarly to the rewrite processing disclosed in Japanese Patent Application Publication (KOKAI) No. 2009-015901 or the like, for example, a write pattern when the servo pattern is recorded is set, and a write current supplied to the write element 44 when the servo pattern is recorded is set.

After the rewrite processing is performed, or if the spiral pattern 31 detected by the detector 501 is the spiral A (NO at S603), the read/write channel circuit 43 performs demodulation processing of a read signal output from the read element 35 that has read the spiral pattern 31 in accordance with the predetermined modulation and demodulation method (S605). The position controller 502 then controls the modulo counter established by the corrector 504 and generates positioning information used for positioning control of the electromagnetic transducer element 40, based on the information of the spiral pattern 31 obtained by the demodulation processing. The positioning information used herein is, for example, the relative position information of the spiral pattern 31 obtained by converting the time subtraction between the reference timing obtained by the sync mark 37 included in the spiral pattern 31 and the peak position timing of the burst 38 into a position error amount in the radial direction. Furthermore, the position controller 502 performs positioning control controller calculation for calculating a correction value so as to correct the position of the electromagnetic transducer element 40 based on the generated positioning information (S606).

Subsequently, the recording signal generator 503 outputs an electric current to the VCM 23 via the motor driver circuit 41 based on the correction value calculated in the positioning control controller calculation to perform the positioning control of the electromagnetic transducer element 40 (write element 44) (S607).

Figure 8:
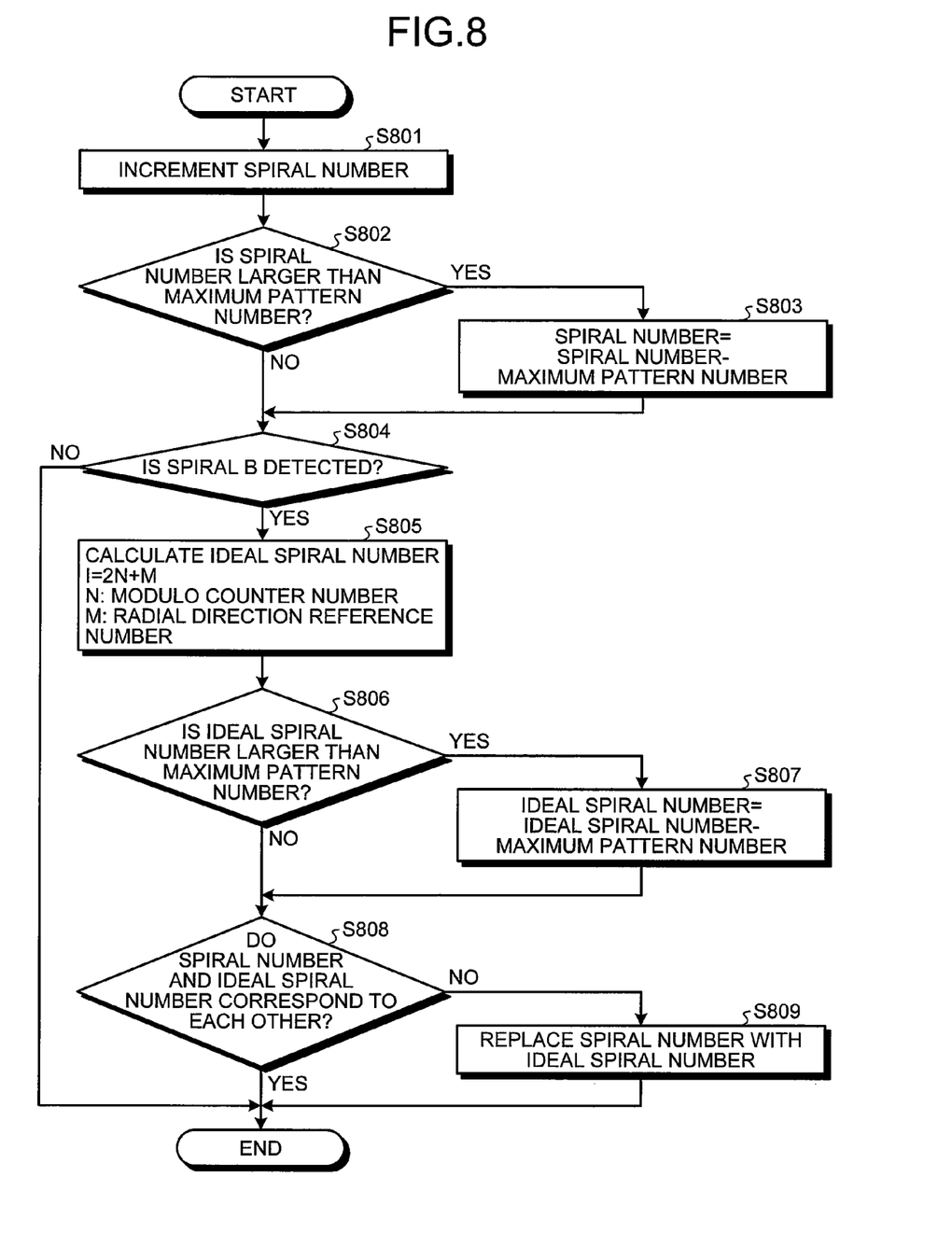
FIG. 8 is an exemplary flowchart illustrating the procedure of generation processing of a spiral number and correction processing of a discrepancy in the spiral number in the embodiment.

The generation processing of the spiral number and the correction processing of the discrepancy in the spiral number will now be described with reference to FIG. 8. FIG. 8 is an exemplary flowchart illustrating the procedure of the generation processing of the spiral number and the correction processing of the discrepancy in the spiral number.

After the corrector 504 (generator) switches the target pattern to be controlled from the seed pattern 30 to the spiral pattern 31, the corrector 504 generates a value on the RAM 54 incremented every time a spiral pattern interrupt is generated as a spiral number of the detected spiral pattern 31 (S801). Subsequently, the corrector 504 determines whether the generated spiral number is larger than the number of the spiral patterns 31 (hereinafter, referred to as a "maximum pattern number") in one round of the track on the magnetic disk 14 (S802). If the generated spiral number is larger than the maximum pattern number (YES at S802), the corrector 504 generates a value by subtracting the maximum pattern number from the generated spiral number as the spiral number (S803). On the other hand, if the generated spiral number is equal to or smaller than the maximum pattern number (NO at S802), the corrector 504 proceeds to 5804 without correcting the generated spiral number. In other words, the corrector 504 (generator) generates the value on the RAM 54 incremented up to the maximum pattern number in one round of the track every time a spiral pattern interrupt is generated as a spiral number of the detected spiral pattern 31.

Figure 9A:
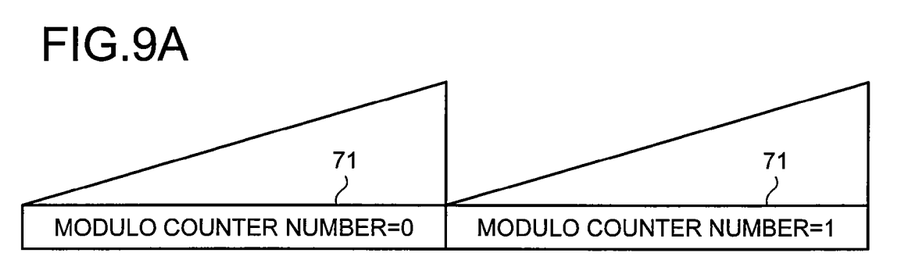
FIG. 9A is an exemplary view illustrating the modulo counter number counted up by the corrector in the embodiment.
Figure 9B:
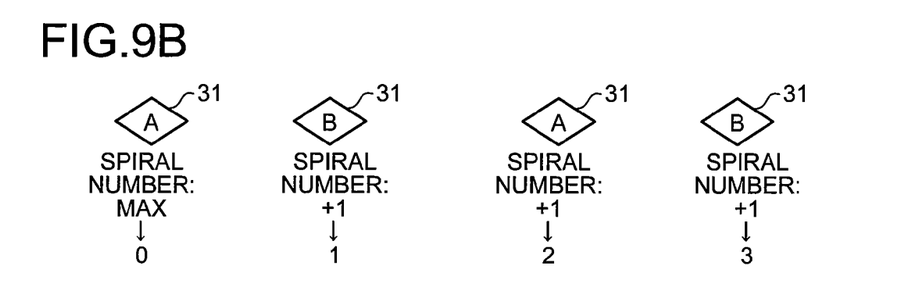
FIG. 9B is an exemplary view illustrating a waveform diagram of the demodulated spiral pattern, and the spiral number incremented by the corrector for explaining the generation processing of the spiral number of the spiral pattern in the embodiment.

FIGS. 9A and 9B are exemplary views for explaining the generation processing of the spiral number of the spiral pattern. FIG. 9A is an exemplary view illustrating the modulo counter number 71 counted up by the corrector 504. When the modulo counter number 71 reaches the number of the seed patterns 30 in one round of the track, the corrector 504 resets the modulo counter number 71 (sets the modulo counter number 71 to "0"). The corrector 504 counts up the module counter number 71 by 1 every operational timing at which the servo sync mark 33 of the seed pattern 30 is detected.

FIG. 9B is an exemplary view illustrating a waveform diagram of the demodulated spiral pattern 31, and the spiral number incremented by the corrector 504. The corrector 504 increments the spiral number on the RAM 54 every time the spiral pattern 31 is detected. If the spiral number on the RAM 54 exceeds the maximum pattern number, the corrector 504 re-expresses the spiral number on the RAM 54 so as to fall within the maximum pattern number. More specifically, the corrector 504 updates the spiral number on the RAM 54 with a value obtained by subtracting the maximum pattern number from the spiral number on the RAM 54. In this manner, the corrector 504 manages the spiral number.

Figure 10A:
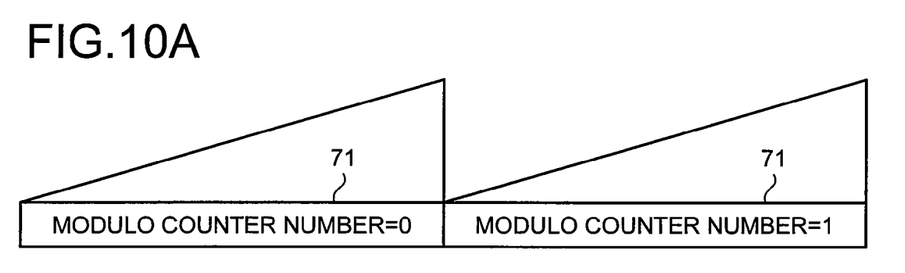
FIG. 10A is an exemplary view illustrating the modulo counter number counted up by the corrector in the embodiment.
Figure 10B:
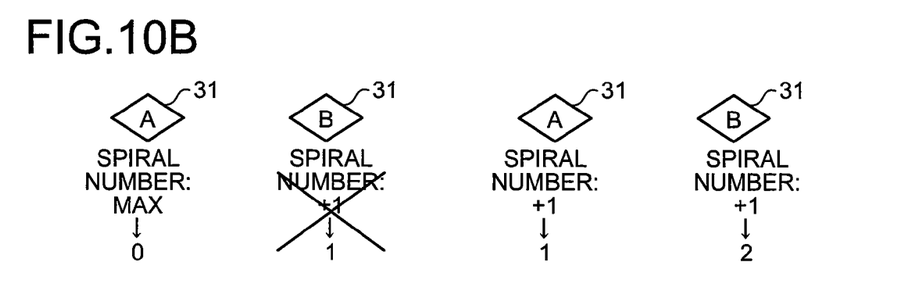
FIG. 10B is an exemplary view illustrating a waveform diagram of the demodulated spiral pattern, and the spiral number incremented by the corrector for explaining the case where a discrepancy occurs in the spiral number of the spiral pattern in the embodiment.

FIGS. 10A and 10B are exemplary views for explaining the case where a discrepancy occurs in the spiral number of the spiral pattern. FIG. 10A is an exemplary view illustrating the modulo counter number 71 counted up by the corrector 504. FIG. 10B is an exemplary view illustrating a waveform diagram of the demodulated spiral pattern 31, and the spiral number incremented by the corrector 504. If no spiral pattern interrupt is generated although the electromagnetic transducer element 40 is positioned at a position where the spiral pattern 31 is formed, as illustrated in FIG. 10B, no increment is added to the spiral number on the RAM 54, resulting in discrepancies in the spiral numbers generated subsequently thereto. Therefore, in the HDD 11 according to the embodiment, the following processing is performed.

Referring back to FIG. 8, when the spiral number is generated (NO at S802, or S803), it is determined whether the detected spiral pattern 31 is the spiral B detected in accordance with the demodulation window 70 opened by the corrector 504 for the second time (S804). Whether the detected spiral pattern 31 is the spiral B is determined because the demodulation window 70 opened by the corrector 504 for the first time is likely to fail because of processing performed in parallel with the output of the demodulation window 70 for the first time. In the embodiment, it is determined whether the detected spiral pattern 31 is the spiral B detected in accordance with the demodulation window 70 opened for the second time. However, it is not limited thereto as long as it is determined whether the detected spiral pattern 31 is the spiral B detected in accordance with the demodulation window 70 finally opened until the modulo counter number 71 is counted up.

If the detected spiral pattern 31 is determined not to be the spiral B (NO at S804), the corrector 504 completes the generation processing of the spiral number.

On the other hand, if the detected spiral pattern 31 is determined to be the spiral B (YES at S804), in the case where a spiral pattern interrupt is generated in association with the detection of the spiral pattern 31 in accordance with the demodulation window 70 finally opened among a plurality of demodulation windows 70, the corrector 504 (calculator) calculates an ideal spiral number based on a multiplied value and a radial direction reference number (S805). The multiplied value is obtained by multiplying the modulo counter number 71 by the number of the spiral patterns 31 detected until the modulo counter number 71 is counted up. The radial direction reference number is assigned to each of the spiral patterns 31 formed in the radial direction of the magnetic disk 14 with reference to the spiral pattern 31 formed at a position to which the electromagnetic transducer element 40 moves (a preset initial position) when the target pattern to be controlled is switched from the seed pattern 30 to the spiral pattern 31. In the embodiment, with reference to the radial direction reference number of the spiral pattern 31 formed at the initial position: "1", the order of the spiral patterns 31 formed in the radial direction of the magnetic disk 14 corresponds to the radial direction reference numbers assigned thereto.

Figure 11:
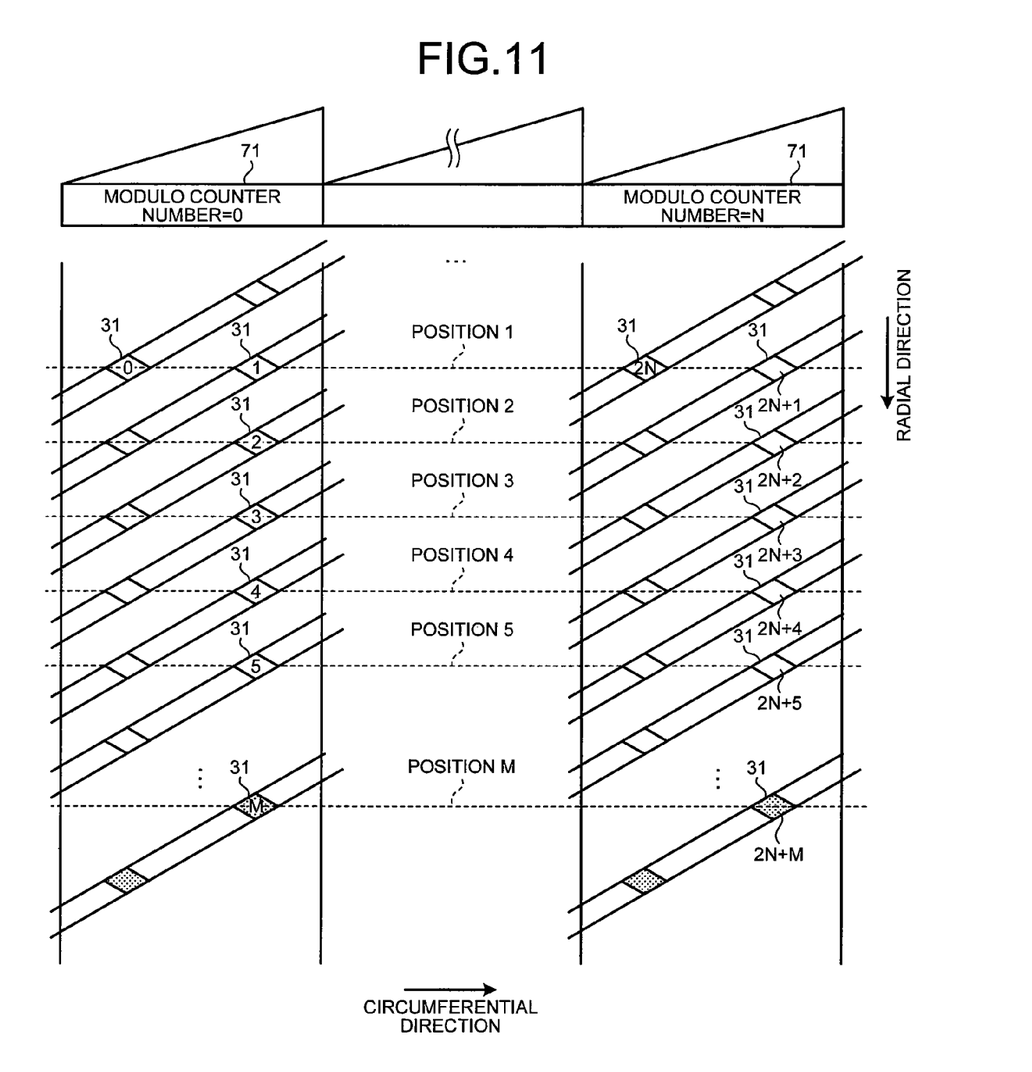
FIG. 11 is an exemplary view for explaining calculation of an ideal spiral number.

FIG. 11 is an exemplary view for explaining the calculation of the ideal spiral number. In FIG. 11, a number described in the spiral pattern 31 represents the radial direction reference number. In the embodiment, as illustrated in FIG. 11, if the modulo counter number 71 is "0", the corrector 504 calculates the ideal spiral number of the spiral pattern 31 formed at the initial position to be the radial direction reference number: "1". With reference to the spiral pattern 31 assigned with the radial direction reference number: "1", the corrector 504 calculates the ideal spiral number of the spiral pattern 31 formed next thereto in the radial direction of the magnetic disk 14 to be the radial direction reference number: "2". In this manner, until the electromagnetic transducer element 40 reaches the outermost spiral pattern 31, the corrector 504 calculates the ideal spiral number of the spiral pattern 31 to be the radial direction reference number: "M".

If the modulo counter number 71 is "N", the corrector 504 calculates the ideal spiral number of the spiral pattern 31 (spiral B) detected in accordance with the demodulation window 70 opened for the second time among the demodulation windows 70 opened until the modulo counter number 71 is counted up to be a value obtained by adding the radial direction reference number: "M" to the multiplied value obtained by multiplying the modulo counter number 71: "N" by the number of the spiral patterns 31 ("2") detected until the modulo counter number 71 is counted up. On the other hand, the corrector 504 calculates the ideal spiral number of the spiral pattern 31 (spiral A) detected in accordance with the demodulation window 70 opened for the first time among the demodulation windows 70 opened until the modulo counter number 71 is counted up to be a value obtained by adding the radial direction reference number: "M-1" to the multiplied value obtained by multiplying the modulo counter number 71: "N" by the number of the spiral patterns 31 ("2") detected until the modulo counter number 71 is counted up. In other words, the ideal spiral number: "I" can be calculated from the multiplied value obtained by multiplying the modulo counter number 71: "N" by the number of the spiral patterns 31 detected until the modulo counter number 71 is counted up and the radial direction reference number: "M".

Referring back to FIG. 8, when the ideal spiral number is calculated, the corrector 504 determines whether the calculated ideal spiral number is larger than the maximum pattern number (S806). If the calculated ideal spiral number is larger than the maximum pattern number (YES at S806), the corrector 504 calculates a value by subtracting the maximum pattern number from the calculated ideal spiral number as the ideal spiral number (S807). On the other hand, if the calculated ideal spiral number is equal to or smaller than the maximum pattern number (NO at S806), the corrector 504 proceeds to S808 without correcting the ideal spiral number.

Subsequently, the corrector 504 determines whether the calculated ideal spiral number and the spiral number generated at S801 correspond to each other (S808). If the calculated ideal spiral number and the generated spiral number do not correspond to each other because of a discrepancy in the spiral number as illustrated in FIG. 10B (NO at S808), the corrector 504 replaces the generated spiral number with the ideal spiral number to correct the generated spiral number (S809). On the other hand, if the calculated ideal spiral number and the generated spiral number correspond to each other (YES at S808), the corrector 504 does not correct the generated spiral number, and defines the generated spiral number as the spiral number of the detected spiral pattern 31.

Figure 12:
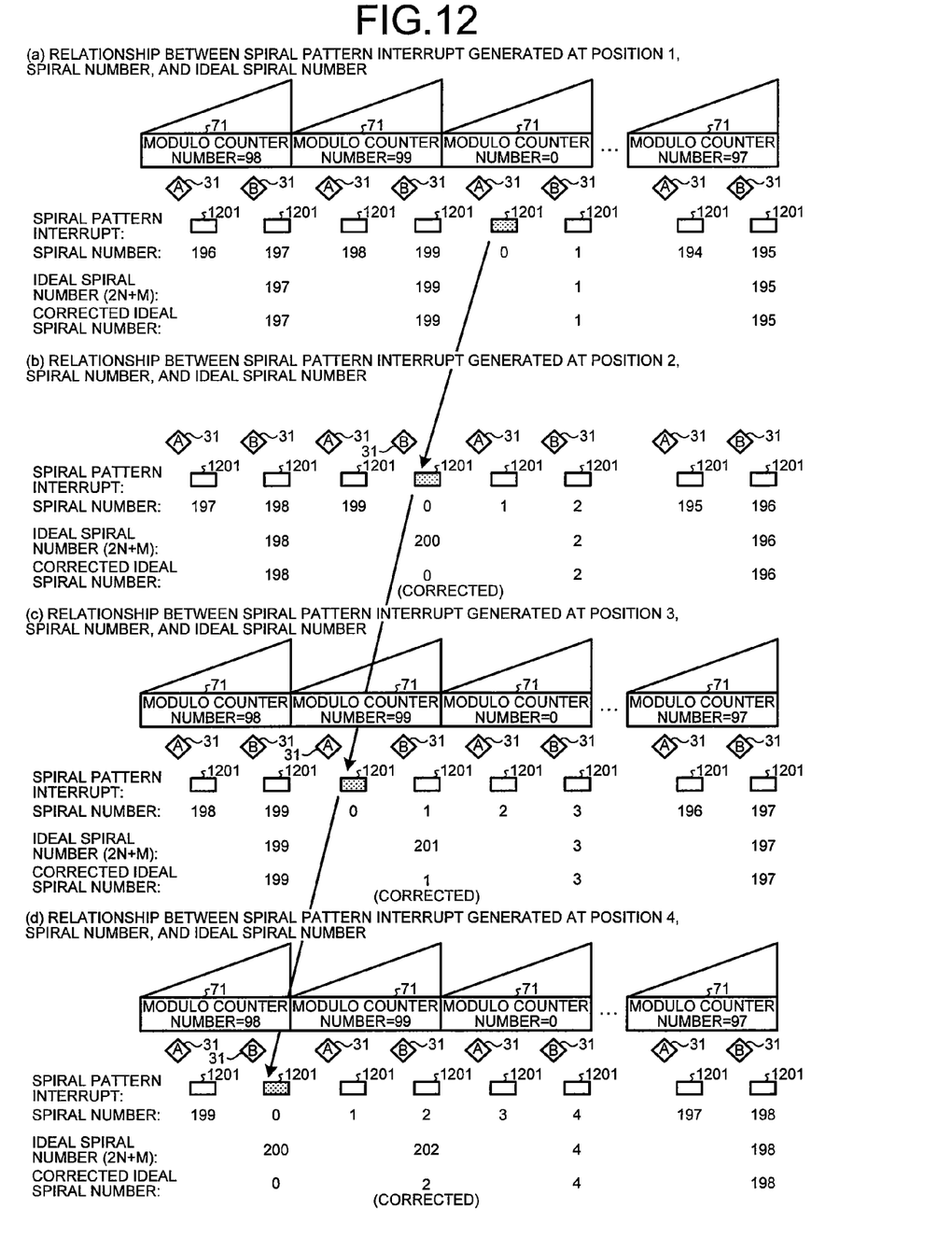
FIG. 12 is an exemplary view for explaining the relationship between spiral pattern interrupts generated at positions 1 to 4 illustrated in FIG. 11, the spiral numbers, and the ideal spiral numbers.

The reason why the maximum pattern number needs to be subtracted from the generated spiral number (or the calculated ideal spiral number) in the case where the generated spiral number (or the calculated ideal spiral number) is larger than the maximum pattern number will now be described with reference to FIG. 12. FIG. 12 is an exemplary view for explaining the relationship between spiral pattern interrupts generated at the positions 1 to 4 illustrated in FIG. 11, the spiral numbers, and the ideal spiral numbers.

In FIG. 12, as a example, the number of seed sectors indicated by the seed sector data 34 included in the seed pattern 30 is "100" (in other words, the modulo counter number 71 is counted up from "0" to "99"), and the number of the spiral patterns 31 (maximum pattern number) indicated by the spiral numbers generated by the detection of the spiral patterns 31 is "200". A reference numeral 1201 indicates an operational timing at which a spiral pattern interrupt is generated.

As illustrated in FIGS. 12($a$) to 12($d$), the position of the spiral pattern 31 indicated by the spiral number generated by the detection of the spiral pattern 31 shifts by one spiral in the circumferential direction of the magnetic disk 14 in association with the movement of the electromagnetic transducer element 40 in the radial direction. For example, the position of the spiral pattern 31 indicated by the spiral number "0" generated by the detection of the spiral pattern 31 shifts by one spiral pattern 31 in the circumferential direction of the magnetic disk 14. In other words, at the time when the electromagnetic transducer element 40 moves in the radial direction, the operational timing at which a spiral pattern interrupt is generated in association with the detection of the spiral pattern 31 changes. On the other hand, even if the electromagnetic transducer element 40 moves in the radial direction, no discrepancy occurs in the modulo counter number 71. Therefore, a discrepancy occurs between the spiral number incremented every time an interrupt is generated in association with the detection of the spiral pattern 31, and the ideal spiral number calculated from the modulo counter number 71 and the radial direction reference number.

Therefore, in the embodiment, when the electromagnetic transducer element 40 moves in the radial direction, the ideal spiral number needs to be corrected depending on the discrepancy in the spiral number incremented every time the interrupt is generated in association with the detection of the spiral pattern 31. More specifically, as described above, if the calculated ideal spiral number is larger than the maximum pattern number, the maximum pattern number is subtracted from the calculated ideal spiral number to correct the ideal spiral number. This causes the ideal spiral number to fall within the range of "0" to "199".

As described above, the HDD 11 according to the embodiment comprises the magnetic disk 14, the detector 501, and the corrector 504. The magnetic disk 14 comprises the seed pattern 30 formed in the radial direction on at least one of the inner area and the outer area, and the spiral pattern 31 formed obliquely to the radial direction. The detector 501 detects the seed pattern 30 and the spiral pattern 31 on the track traversing the seed pattern 30 and the spiral pattern 31 on the magnetic disk 14. The corrector 504 establishes the modulo counter that counts the modulo counter number 71 up to the number of the seed patterns 30 in one round of the track at the operational timing at which a seed pattern 30 is detected, and generates the value incremented up to the maximum pattern number every time the spiral pattern interrupt 70 is generated in association with the detection of the spiral pattern 31 as the spiral number of the detected spiral pattern 31. The corrector 504 then calculates the ideal spiral number based on the multiplied value and the radial direction reference number. The multiplied value is obtained by multiplying the modulo counter number 71 by the number of the spiral patterns 31 detected until the modulo counter number 71 is counted up. The radial direction reference number is set to the spiral pattern 31 formed in the radial direction of the magnetic disk 14 with reference to the spiral pattern 31 formed at the preset initial position. If the generated spiral number and the calculated ideal spiral number do not correspond to each other, the corrector 504 corrects the spiral number with the ideal spiral number. With this configuration, even if the spiral pattern interrupt 70 generated in association with the detection of the spiral pattern 31 is skipped, a correct spiral number can be generated. Accordingly, after the target pattern to be controlled is switched from the seed pattern 30 to the spiral pattern 31, in the plurality of spiral patterns 31 formed continuously in an oblique manner from the inner area to the outer area in the radial direction, the reliability of the spiral number indicating what number a spiral pattern 31 is in the circumferential direction can be increased.

The positioning program executed in the HDD 11 according to the embodiment is provided in a manner installed in the ROM 51 or the like in advance. However, it is not limited thereto, and may be provided in a manner recorded in a computer-readable recording medium such as a compact disk read-only memory (CD-ROM), a flexible disk (FD), a compact disk recordable (CD-R), and a digital versatile disk (DVD), as a file in an installable or an executable format.

The positioning program executed in the HDD 11 according to the embodiment may be provided in a manner stored in a computer connected to a network such as the Internet to be downloaded via the network. Furthermore, the positioning program executed in the HDD 11 according to the embodiment may be provided or distributed via a network such as the Internet.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
    a disk comprising a first pattern formed in a radial direction of the disk on at least one of an inner area and an outer area of the disk, and a second pattern formed obliquely to the radial direction;
    a detector configured to detect the first pattern and the second pattern on a track traversing the first pattern and the second pattern on the disk;
    a counter configured to count number of the detected first pattern until the count value reaches number of the first pattern in one round of the track;
    a generator configured to generate a value incremented until the value reaches a maximum pattern number that is number of the second pattern in one round of the track every time an interrupt is generated in association with detection of the second pattern as number of the second pattern detected by the detector;
    a calculator configured to calculate an ideal number based on a multiplied value and a radial direction reference number, wherein the multiplied value is obtained by multiplying the number of the second pattern detected until the number is counted by the counter by the counted number of the detected first pattern, and the radial direction reference number is set to the second pattern formed in the radial direction of the disk with reference to the second pattern formed at a preset initial position; and
    a corrector configured to correct the generated number with the calculated ideal number if the generated number is not identical to the calculated ideal number.

2. The storage device of claim 1, wherein
    the calculator is configured to calculate a value obtained by adding the multiplied value and the radial direction reference number as the ideal number.

3. The storage device of claim 1, wherein
    the detector is configured to detect the second pattern in accordance with a timing signal for detecting the second pattern.

4. The storage device of claim 3, wherein
the detector is configured to detect the second pattern in accordance with a plurality of the timing signals output until the number is counted by the counter, and
the calculator is configured to calculate the ideal number if an interrupt is generated in association with detection of the second pattern in accordance with the timing signal output finally among the timing signals.

5. An information correction method performed in a storage device comprising a disk that comprises a first pattern formed in a radial direction of the disk on at least one of an inner area and an outer area of the disk, and a second pattern formed obliquely to the radial direction, the information correction method comprising:
    detecting the first pattern and the second pattern on a track traversing the first pattern and the second pattern on the disk;
    counting number of the detected first pattern until the count value reaches number of the first pattern in one round of the track;
    generating a value incremented until the value reaches a maximum pattern number that is number of the second pattern in one round of the track every time an interrupt is generated in association with detection of the second pattern as number of the second pattern detected;
    calculating an ideal number based on a multiplied value and a radial direction reference number, wherein the multiplied value is obtained by multiplying the number of the second pattern detected until the number is counted in the counting by the counted number of the detected first pattern, and the radial direction reference number is set to the second pattern formed in the radial direction of the disk with reference to the second pattern formed at a preset initial position; and
    correcting the generated number with the calculated ideal number if the generated number is not identical to the calculated ideal number.

6. The information correction method of claim 5, wherein
the calculating comprises calculating a value obtained by adding the multiplied value and the radial direction reference number as the ideal number.

7. The information correction method of claim 5, wherein
the detecting comprises detecting the second pattern in accordance with a timing signal for detecting the second pattern.

8. The information correction method of claim 7, wherein
the detecting comprises detecting the second pattern in accordance with a plurality of the timing signals output until the number is counted in the counting, and
the calculating comprises calculating the ideal number if an interrupt is generated in association with detection of the second pattern in accordance with the timing signal output finally among the timing signals.

9. The storage device of claim 2, wherein
the detector is configured to detect the second pattern in accordance with a timing signal for detecting the second pattern.

10. The storage device of claim 9, wherein
the detector is configured to detect the second pattern in accordance with a plurality of the timing signals output until the number is counted by the counter, and
the calculator is configured to calculate the ideal number if an interrupt is generated in association with detection of the second pattern in accordance with the timing signal output finally among the timing signals.

11. The information correction method of claim 6, wherein
the detecting comprises detecting the second pattern in accordance with a timing signal for detecting the second pattern.

12. The information correction method of claim 11, wherein
the detecting comprises detecting the second pattern in accordance with a plurality of the timing signals output until the number is counted in the counting, and
the calculating comprises calculating the ideal number if an interrupt is generated in association with detection of the second pattern in accordance with the timing signal output finally among the timing signals.

* * * * *